Figure 1:
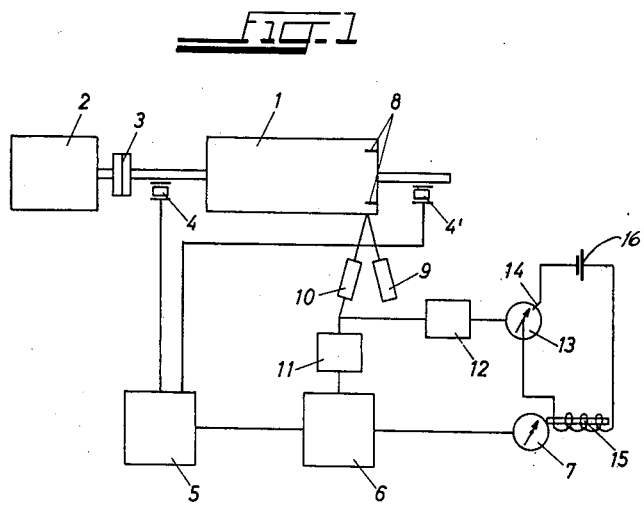

Feb. 5, 1963 K. HILGERS 3,076,342
BALANCING MACHINE
Filed Jan. 11, 1960 3 Sheets-Sheet 1

INVENTOR.
KARL HILGERS
BY
Jones, Darby & Robertson
ATTYS.

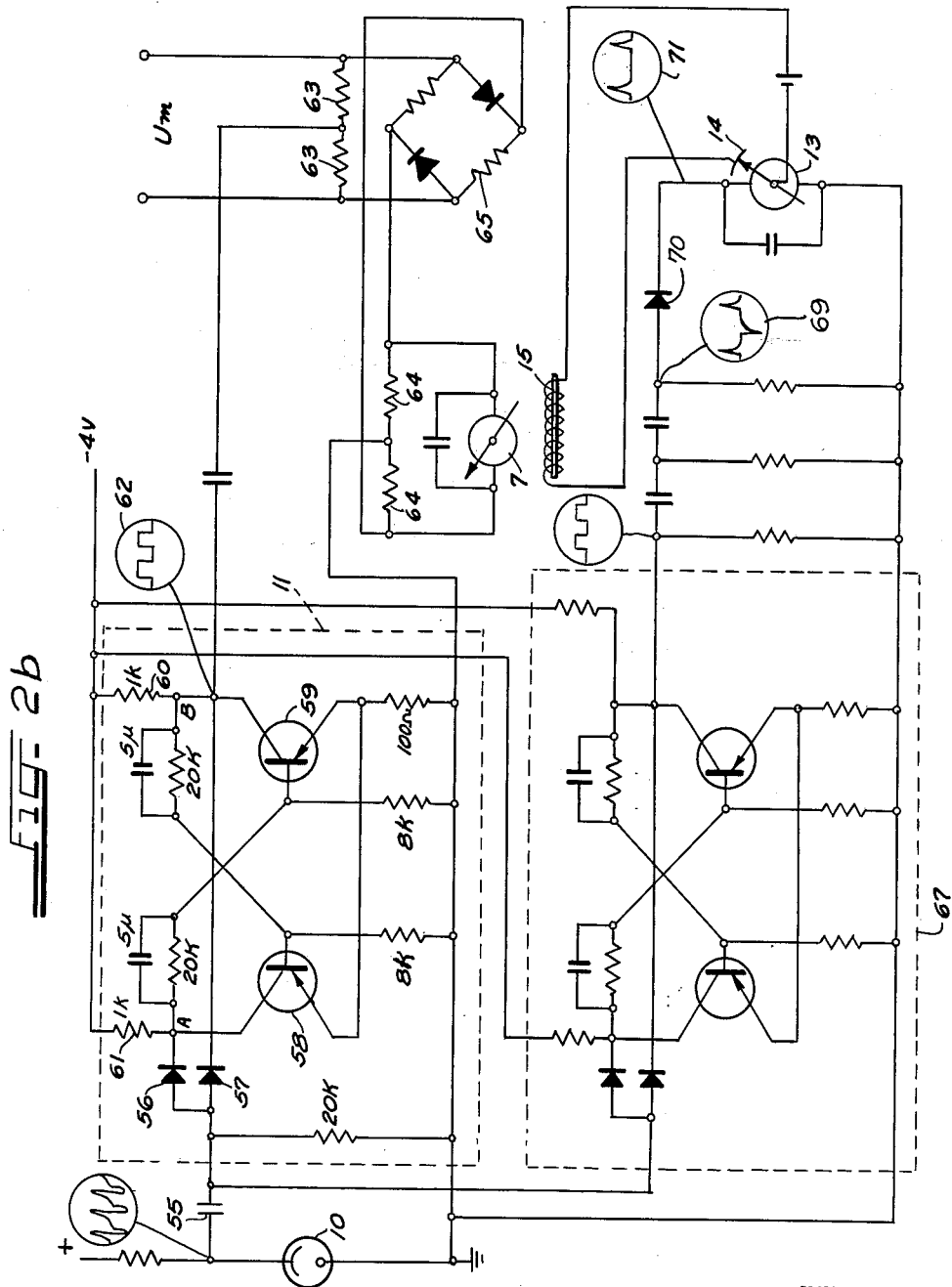

United States Patent Office 3,076,342
Patented Feb. 5, 1963

3,076,342
BALANCING MACHINE
Karl Hilgers, Dusseldorf, Germany, assignor to Losenhausenwerk, Dusseldorfer Maschinenbau A.G., Dusseldorf-Grafenberg, Germany
Filed Jan. 11, 1960, Ser. No. 1,594
Claims priority, application Germany Jan. 9, 1959
6 Claims. (Cl. 73—462)

Balancing machines are well known in which a rotating body to be balanced produces an alternating measuring voltage proportional to the amount of unbalance.

With balancing machines of more recent design, the phase or angular position of the unbalance is normally determined with the aid of a transmitter which revolves with the body to be balanced, and supplies a reference alternating voltage of predetermined phase relationship to the rotating body. The measuring voltage (indicating the amount of unbalance) is then measured by an instrument responsive also to its phase relationship to this alternating voltage, which may be done, for instance, by means of a phase controlled rectifier or by means of a wattmeter. The phase relationship of the alternating voltage to the rotating body is then varied until the indicating instrument indicates zero. The auxiliary alternating voltage is then out of phase by exactly 90 degrees with respect to the measuring voltage.

The measuring voltage may be either tapped from moving coils, which are arranged in the bearing planes and connected in opposition in a definite manner for the purpose of balancing residual moments, or from power measuring transmitters which are also arranged in the bearing planes and which may be piezoelectric elements, using, for example, barium titanate. It is necessary with such an arrangement that balancing measurement be effected at a certain predetermined speed of revolution. The value of the out-of-balance forces and the amount of phase shifts (which may be produced by band-pass filter elements) depend on the speed of revolution.

For many bodies to be balanced, especially small ones, it is necessary during measurement that the body to be balanced be free from all external forces, such as may be produced by the drive for instance. In order to eliminate the influence of such external forces, it has previously been suggested to drive such bodies to be balanced by means of a belt which is placed over the body to be balanced. Other balancing machines make use of compressed air as the driving means of the body to be balanced. However, it has been found in practice that even these types of drive give rise to disturbing influences affecting the accuracy of measurement.

The invention has therefore for its object the elimination of these disadvantages of the well-known balancing machines.

According to the invention this object is accomplished with the aid of a balancing machine in which the body to be balanced is driven and then is disengaged from the driving means to allow it to slow down, and which measures the unbalance during the slowing down of the body to be balanced. According to the invention, the speed of revolution of the slowing down body to be balanced is measured, and when the speedometer indicates the speed desired for measurement, it actuates a device for recording the value at that instant of the unbalance indication device. If use is made of a speedometer operating without mechanical contact with the body to be balanced, the body to be balanced can rotate free of all external forces in its bearings. This can be accomplished if a mark affixed to the body to be balanced is scanned photoelectrically and the speedometer is so designed that it measures the frequency of the photoelectric impulses. Speedometers of this type are well known per se.

The invention is more fully explained in the following detailed description wherein reference is made to an embodiment which is illustrated schematically in the accompanying drawings.

In the drawings one form of the invention has been diagrammatically illustrated.

Figure 2A:
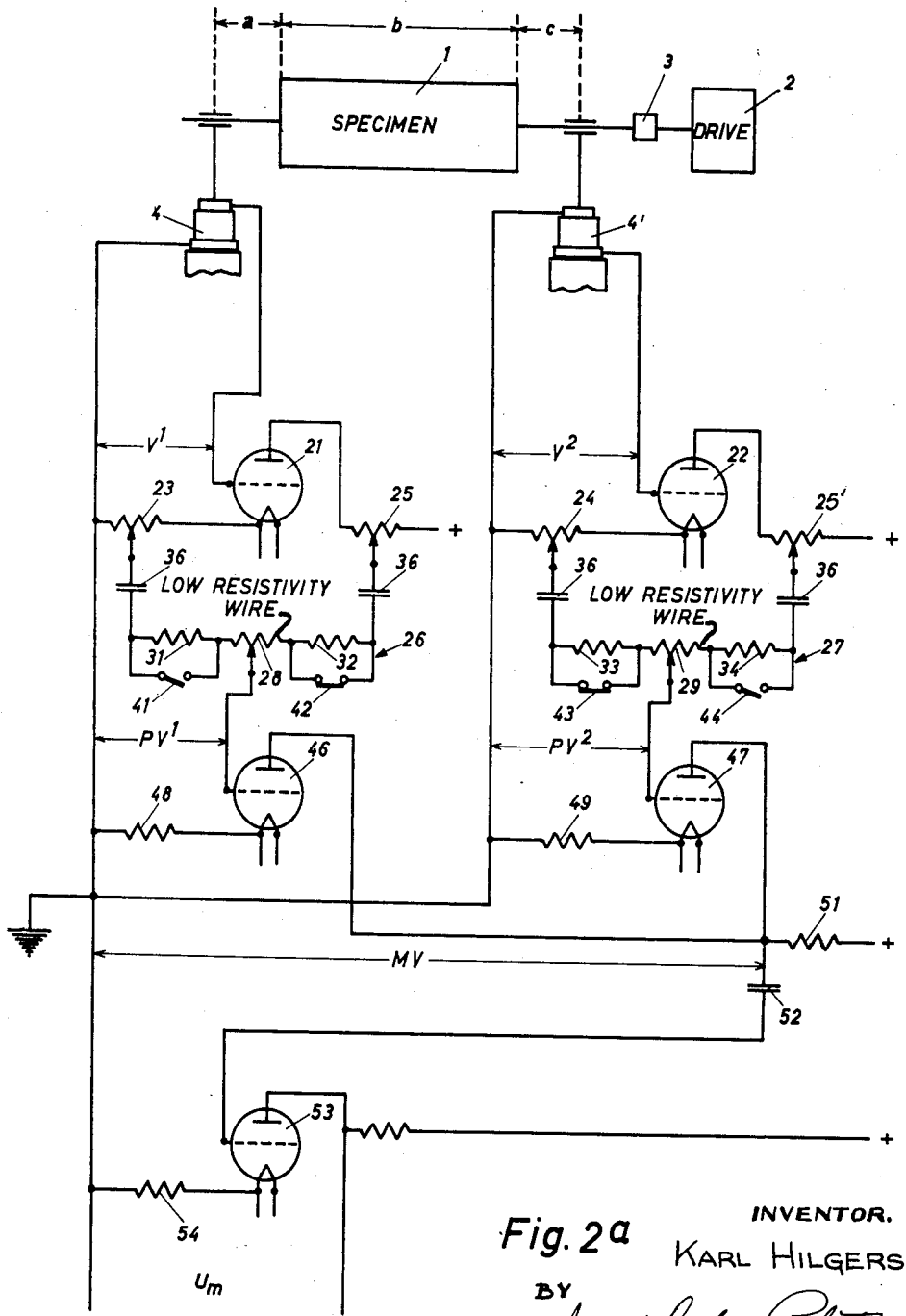

FIG. 1 is a circuit diagram for a balancing machine according to the invention, and FIGS. 2a and 2b show the circuit arrangement for the balancing machine in a more detailed representation.

General Description

Although the following disclosure offered for public dissemination is detailed to ensure adequacy and aid understanding, this is not intended to prejudice that purpose of a patent which is to cover each new inventive concept therein no matter how others may later disguise it by variations in form or additions or further improvements. The claims at the end hereof are intended as the chief aid toward this purpose, as it is these that meet the requirement of pointing out the parts, improvements, or combinations in which the inventive concepts are found.

In order that the invention may be better understood, reference is first of all made to FIG. 1 showing the principal setup of the balancing machine in the form of a block diagram. Details of the circuit arrangement will be apparent from FIGS. 2a and 2b.

A body to be balanced 1 is driven by means of an electric motor 2 through a clutch 3. The bearing forces brought about by the unbalance are measured by barium titanate elements 4, 4' and through an amplifier 5 are fed into a phase sensitive rectifier 6 for the purpose of determination of the phase position of the unbalance. The phase sensitive rectifier 6 may be controlled by means of an auxiliary or reference alternating voltage, the phase of which is controlled photoelectrically in a manner which will be described hereinbelow by a mark 8 provided on the body to be balanced 1. The output voltage is fed into a measuring instrument 7 which indicates one of the components of the unbalance to be measured. Although not illustrated a second phase sensitive rectifier, which is controlled by a second corresponding reference alternating voltage, may be provided in well-known manner for the measuring of another unbalance component which is out of phase by 90 degrees with respect to the first mentioned component.

Marks 8 are located diametrically on the body to be balanced. These marks are spotted with a beam of light from the lamp 9 and scanned by means of a photoelectric cell or photoelectric transmitter 10. The photoelectric transmitter 10 controls, as described above, the reference alternating voltage which may be generated by a flip-flop or other type of input-responsive generator 11. The photoelectric impulses are also fed into an electronic speedometer 12. There, they are modified to form impulses of definite height and length and fed into a direct current instrument 13 whose deflection is directly proportional to the speed of revolution of the body to be balanced. The direct current instrument 13 has a contact 14 through which the circuit of a locking magnet 15, which is energized by means of a source of current 16, is closed when the chosen measurement speed of revolution is reached as the rotating body slows down. The locking magnet 15 then locks the indication of the instrument 7 and that of other measuring instruments that might be provided for the unbalance indication. Other means for recording the instantaneous value of unbalance indicating instrument could be substituted for the locking magnet 15.

Basic Operation

The body to be balanced 1 is driven by the motor 2 in excess of its measuring speed of revolution. Then, the clutch 3 is disengaged. The body to be balanced slows down, and the indication of the instrument 7, of course, varies with the speed of revolution. As soon as the chosen measuring speed of revolution is reached, magnet 15 attracts and locks the correct indication on the instrument 7 which is obtained at this speed.

The individual elements of the circuit arrangement are shown in FIGS. 2a and 2b and described in the following:

The Circuit Arrangement for the Measuring Voltage

As represented in FIG. 2a, the voltages $V_1$ and $V_2$ developed in the barium titanate elements are impressed across grids of the preamplifier tubes 21, 22. The cathode resistors 23, 24 and the anode resistors 25, 25' are designed as adjustable potentiometers. Both of the cathode resistors 23, 24 are unilaterally grounded. Between the taps of these adjustable potentiometers are arranged voltage divider systems 26 and 27. Each of the voltage divider systems can include a low resistivity wire potentiometer 28 or 29 with which is connected in series fixed resistors 31, 32, 33 and 34, and also coupling condenser 36 to eliminate the direct current voltage impressed across the tube. The resistors 31 to 34 may be selectively short-circuited by means of the switches 41, 42, or 43 and 44 respectively. The switches may be coupled to simultaneously close switches 41 and 44 and open switches 42 and 43.

Each of the partial voltages $PV_1$, $PV_2$ tapped from the potentiometers 28 and 29 is impressed across a grid of a tube 46 or 47 the cathode of which is also grounded via a cathode resistor 48 or 49, respectively.

The anodes of the tubes 46, 47 are connected to the positive pole of a source of power, grounded on its negative pole, by means of a common anode resistor 51. An alternating measuring voltages MV from the common anode resistor 51 is coupled by condenser 52 to the input grid of a further amplifier represented by tube 53, the cathode of which is also grounded through a cathode resistor 54. The amplifier measuring voltage may then be fed in any well-known manner to a measuring instrument which would be, for instance, a wattmeter. However, FIG. 2b shows the use of a direct current instrument in conjunction with a phase controlled rectifier (ring modulator).

Filter elements may be interconnected between the transmitters and the preamplifier tubes or between the amplifier stages. Likewise, grid biasing networks may be added to make the grid voltages vary within an optimum range.

The operation of the arrangement shown in FIG. 2a is as follows:

The transmitters 4 and 4' supply alternating voltages $V_1$, $V_2$ which are proportional to the out-of-balance forces effective in the bearing planes. In order to obtain measuring voltages which correspond to the out-of-balance forces in the two compensation planes assumed to be at the ends of the specimen, it is necessary to tap from the transmitter voltages partial voltages which are proportional successively to $$h\frac{a+b}{b}$$

and to $$h\frac{c}{b}$$

for the left-hand compensation plane or proportional successively to $$h\frac{a}{b}$$

and to $$h\frac{b+c}{b}$$

for the right-hand compensation plane, and the two partial voltages in each instance must be connected in opposition to each other. In these expressions, $h$ is a proportionality factor. The values $a$, $b$ and $c$ are respectively, as shown in FIG. 2a, the distance from the left-hand bearing toward the right to the left-hand compensation plane, the distance between the two compensation planes, and the distance from the right-hand bearing leftward to the right-hand compensation plane. The values $a$ and $c$ may, of course, also have negative sign if the compensation planes are outside the bearing planes. Accordingly, also negative partial voltages may become necessary.

In order to be able to adjust the partial voltage ratios to reflect the actual spacing of bearing planes and compensation planes, the voltage divider systems 26 and 27 each lies between a tap of the cathode resistor 23 or 24 and a tap of the anode resistor 25 or 25'. If the taps for resistors 23 and 25, for example are at midpoints on the resistors, the average of the tap voltages (or of the voltage differences between the taps and ground) remains constant in spite of changes in the plate current through the tube 21. If the taps are moved in one direction, an increase of plate current causes an increase of average tap voltage. As the taps are moved in the opposite direction from the midpoint, an increase of plate current causes a drop of average tap voltage. It follows that in one case an increasing plate current in tube 21 causes an increasing plate current in tube 46 while in the other case it causes a decreasing plate current in tube 46. Hence, if tube 47 remains unchanged in this respect, tube 46 can be either in phase with it or 180 degrees out of phase with it, so that it either adds its plate current or substracts it. Thus, each pair of voltage taps on resistors 23 and 25 or 24 and 25' passes from its one end position to the other through a zero point in which a zero voltage effect results. On the one side of this zero point, positive partial voltages may result, while negative (out of phase by 180 degrees) partial voltages result when the taps are on the other side. Accordingly, all possible positions of the compensation and bearing planes are covered.

For the purpose of changing over from one compensation plane to the other, both of the partial voltage ratios tapped from the potentiometers 28 and 29 must in each case be changed by a constant value which happens to be $h$. With the arrangement shown, this is accomplished by alternately connecting one of resistors 31, 32, 33 and 34, all of corresponding value, in front of or behind the potentiometer 28 or 29. This has, as will be readily understood, the same effect as a movement of the voltage divider tap. It is therefore unnecessary to effect a new adjustment of the voltage dividers for each compensation plane or to provide two separate taps which are coupled with each other.

The partial voltages $PV_1$ and $PV_2$ control through the grids the plate or anode currents of the tubes 46, 47 which are thus proportional (or the modulation amplitudes of which are proportional) to the partial voltages respectively, and both of which flow through the resistor 51. On this resistor is obtained an alternating measuring voltage or signal proportional to the sum of the plate currents (or the sum of their modulations), and which may be negative in effect. This voltage (or its modulation amplitude) is in usual manner further amplified by the amplifiers 53 and forms a measuring voltage $U_m$. Such a circuit arrangement forms the object of my co-pending application Ser. No. 790,167 filed January 30, 1959.

The Generation of Reference Voltage

As represented in FIG. 2b the photoelectric cell or photoelectric transmitter 10 supplies an impulse upon the passage of each of the marks 8, the impulse being fed as a positive impulse through a condenser 55 and the rectifiers 56, 57 to a flip-flop or bistable trigger stage which is generally designated by numeral 11 and which is well known per se. It is shown as comprising two transistors 58 and 59. The base of the transistor 58 is connected through a resistor and a condenser to the collector of the transistor 59 and vice versa. If now the transistor 59 is in the conductive state, there is a current flow which produces a potential drop at the resistance 60, so that point B has a stronger positive potential than point A (FIG. 2b). This potential is impressed across the base of the transistor 58, so that this latter transistor is blocked. If now a positive impulse reaches the base of the transistor 59 via the rectifier 56, this latter transistor is blocked. The potential of the point B thereby changes to the negative. The transistor 58 becomes conductive. Consequently the potential of A, due to the voltage drop on the resistance 61, changes to positive and thus also the potential of the base of the transistor 59. Thus, this latter transistor remains blocked and the transistor 58 remains conductive. With the next positive impulse, through rectifier 57, the circuit arrangement flips over in corresponding manner from the transistor 58 to the transistor 59.

The potential on point B thus forms a square-wave voltage as indicated in FIG. 2b by means of the oscillograph screen image 62. The square-wave voltage is fed to a phase sensitive rectifier arrangement 65 via pairs of symmetrical resistors 63, 64 and controls the rectifier arrangement 65.

At the same time also the measuring voltage $U_m$ is fed to the rectifier arrangement 65. A voltage is then developed on the measuring instrument 7 (also see FIG. 1) and the direct current component of which is proportional to the measuring voltage times the cosine of the phase angle formed between the measuring voltage and the square-wave voltage serving as a comparison or reference voltage.

*The Measurement of the Speed of Revolution*

The photoelectric impulses are at the same time fed to a second flip-flop or bistable trigger stage 67, which is in priciple designed in exactly the same manner as the trigger stage 11, so that a more detailed description is unnecessary. The square-wave voltage is converted by means of an impulsing network 68, so that for each voltage reversal of the square-wave a brief impulse results, all impulses being equal, though alternately opposite. The negative impulses thus obtained are "cut off" in a rectifier 70. Thus, there results impulses of exactly uniform form such as indicated on the oscillograph screen image 71, and whose frequency is proportional to the frequency of revolution of the body to be balanced. These are fed to a direct current instrument 13 which supplies a measured value of the main direct current value of the impulses and thus of the frequency of revolution of the body to be balanced.

The instrument 13 has, as already explained in conjunction with FIG. 1, a switching contact 14 through which is actuated a locking device 15 provided for the instrument 7.

I claim:
1. A balancing machine including a pair of bearings for supporting the rotating body to be balanced, driving means for rotating the body, clutch means for coupling the driving means to the body and releasing it therefrom, to allow the body to rotate freely, an electrical system associated with the bearings for determining a value of unbalance in the rotating body and including an indicating instrument indicating the determined unbalance value and having means for locking it to record its indication at any time, said system being subject to variations with variations in rotating speed of the body, speed determining means responsive to the rotation of the body, and effective to transmit a signal as the body reaches a predetermined speed in slowing down, said locking means being responsive to the signal for recording the value at that instant determined by said system to be the value of unbalance in the body.

2. A balancing machine according to claim 1 in which the speed determining means is constructed to operate free of mechanical connection with the rotating body.

3. A balancing machine according to claim 1 in which the speed determining means includes a photoelectric transmitter arranged to scan demarcations on the rotating body.

4. A balancing machine in which the body to be balanced is put in revolving motion and disengaged from the driving means and then is allowed to slow down, and with which the unbalance is measured during its slowing down, characterized by including an unbalance indicating device having means for recording an indication thereof, and means responsive to the speed of revolution of the slowing down body to be balanced to actuate the means for recording when the body slows down to a predetermined speed.

5. A balancing machine including a pair of bearings for supporting the rotating body to be balanced, driving means for rotating the body, clutch means for coupling the driving means to the body and releasing it therefrom to allow the body to rotate freely, an electrical system associated with the bearings for determining a value of unbalance in the rotating body and including means for recording a value as determined by the system, said system being subject to variations affecting accuracy with variations in rotating speed of the body, and speed determining means responsive to the rotation of the body and effective to transmit a signal as the body reaches a predetermined speed in slowing down; said means for recording being effectuated by said signal for recording the value determined at that instant by said system to be the value of unbalance in the body.

6. A balancing machine including a pair of bearings for supporting the rotating body to be balanced, driving means for rotating the body, clutch means for coupling the driving means to the body and releasing it therefrom, to allow the body to rotate freely, an electrical system including substantially nonyielding force-sensitive means associated with the bearings for determining a value of unbalance in the rotating body while substantially restraining it from oscillation and including an indicating instrument indicating the determined unbalance value and having means for locking it to record its indication at any time, said system being subject to variations with variations in rotating speed of the body, speed determining means responsive to the rotation of the body, and effective to transmit a signal as the body reaches a predetermined speed in slowing down remote from the resonant speed of the body as mounted, said locking means being responsive to the signal for recording the value at that instant determined by said system to be the value of unbalance in the body.

References Cited in the file of this patent

UNITED STATES PATENTS

| 2,361,990 | Brown | Nov. 7, 1944 |
| 2,383,405 | Merrill et al. | Aug. 21, 1945 |
| 2,712,232 | Pfeiffer | July 5, 1955 |

FOREIGN PATENTS

| 821,133 | Germany | Nov. 15, 1951 |
| 1,008,024 | Germany | May 9, 1957 |

UNITED STATES PATENT OFFICE
CERTIFICATE OF CORRECTION

Patent No. 3,076,342  February 5, 1963

Karl Hilgers

It is hereby certified that error appears in the above numbered patent requiring correction and that the said Letters Patent should read as corrected below.

Column 5, line 56, for "main" read -- mean --.

Signed and sealed this 24th day of September 1963.

(SEAL)
Attest:

ERNEST W. SWIDER
Attesting Officer

DAVID L. LADD
Commissioner of Patents